Figure 1:
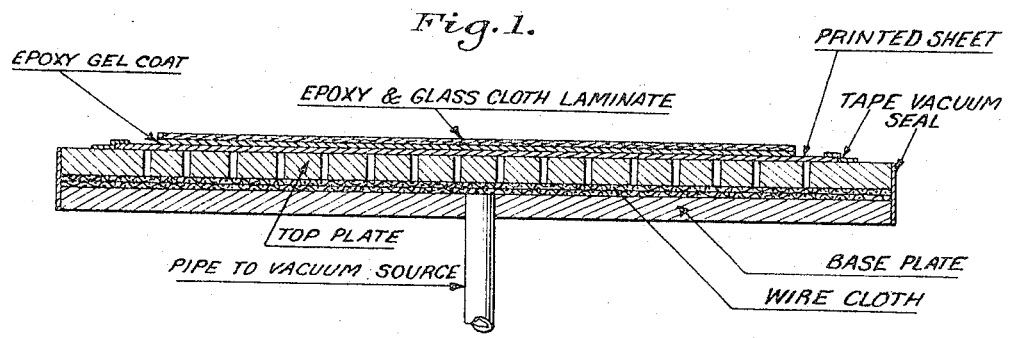

United States Patent Office 3,309,254
Patented Mar. 14, 1967

3,309,254
PROCESS FOR TRANSFER OF INK OR DYE PRINTED IMAGES TO EPOXY RESIN SURFACES
James Walker Rowe, 600 Dean Drive, Rockville, Md. 20851
Filed Feb. 3, 1961, Ser. No. 87,046
5 Claims. (Cl. 156—240)

The invention described herein may be manufactured and used by or for the Government for governmental purposes without the payment of any royalty thereon.

The present invention relates to the transfer of ink or dye printed images on and into epoxy resin surfaces.

In accordance with this invention, an epoxy resin, otherwise described as a glycidyl ether of polyhydric phenols, such as that formed as a reaction product of epichlorohydrin and bisphenol A in the presence of a strong caustic such as sodium hydroxide, when catalyzed with an amine-type hardener, has a strong affinity for a wide variety of materials, including vinyl base inks, pigmented bichromated casein inks, and oil soluble dyes. A transfer of printed images can be effected as long as the affinity of the epoxy resin for the inks or dyes is greater than that of the material on which the image is printed. The inks become chemically bonded and thus offer excellent resistance to solvents and good resistance to abrasives. Where dyes are used, the image becomes resistant to solvents and highly resistant to abrasives. The imprinted epoxy surfaces will withstand heat up to 347° F. without affecting the image. These dyes will penetrate the epoxy resin to a depth of approximately 0.002 inch. A property of the epoxy resin is such that during the transfer process its surface assumes the surface characteristics of the material from which the transfer was made. For example, if the surface of the printed material is either glossy or semi-matte, the surface of the epoxy resin will likewise be glossy or semi-matte. Accordingly, this invention provides a novel process for transfer-printing of epoxy resins from flat or from three-dimension surfaces of various materials. The mechanical process comprises in essence the coating of epoxy resin together with a hardener on a printed sheet and the separation of the printed resin from the sheet.

Previously developed transfer methods have required the preparation of a transfer on a temporary supporting material such as paper which must be soaked in water prior to removal of the transfer or the preparation of a permanent transfer layer and a decorative layer in such a manner as both are applied to the object to which the transfer is made, or, in the case of plastics, a bearer of fibrous material upon which the printed matter has been impressed, the transfer taking place by the absorption of the fibers into the plastic, or, again in the case of plastics, the use of a thermoplastic ink which penetrates into a plastic surface under conditions of extreme heat.

The instant invention enables, in situations where an epoxy resin surface may be the surface to which the final transfer is made, the direct transfer, without a permanent transfer media, without soaking in water, without extreme heat and pressure, and without the further treatment required of the surface to which the transfer has been made as in the case of the transfer by absorption of fibers from the bearer into the plastic surface.

Figure 2:
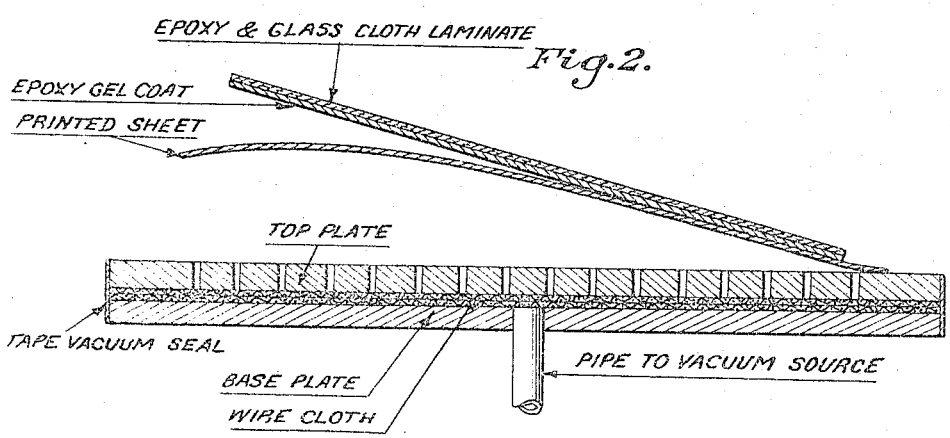
Figure 3:
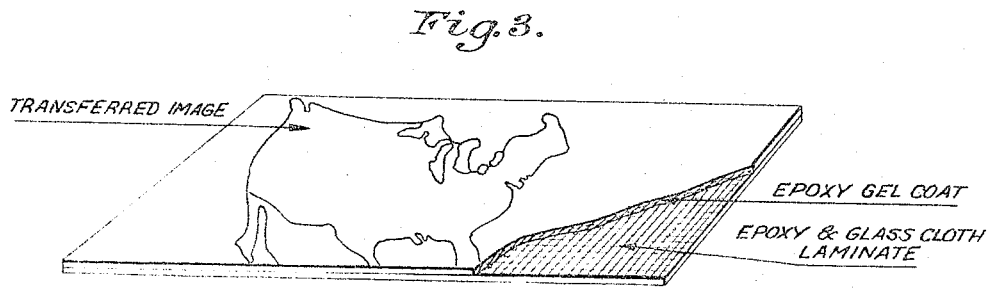

Other objects and advantages of the invention will be fully understood from the following description and claims when taken in connection with the accompanying drawings, in which:

FIGS. 1, 2, and 3 show in cross-section the application of this invention in transferring an image from and to a flat surface. In FIG. 1 the epoxy resin is shown in contact with the printed sheet, which sheet in turn is supported firmly during the transfer process by a vacuum top plate. FIG. 2 shows the removal of the printed sheet and the epoxy resin with the images imprinted thereon from the vacuum top plate and the separation of the formerly printed sheet from the now imprinted epoxy resin. FIG. 3 shows the finished epoxy resin with the transferred image therein.

Figure 4:
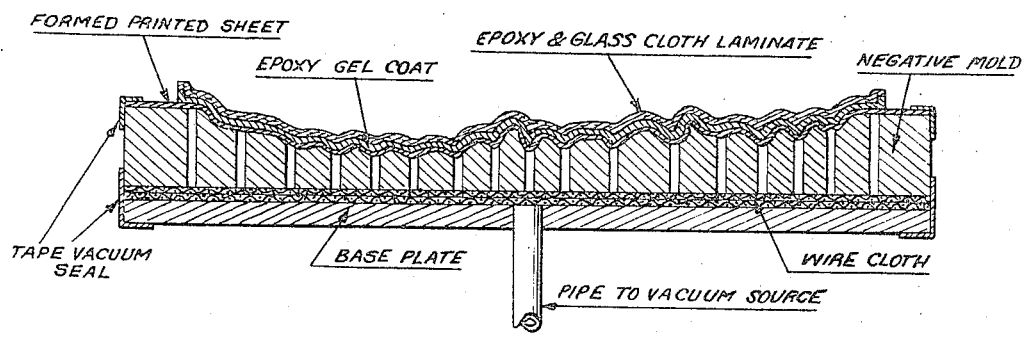
Figure 5:
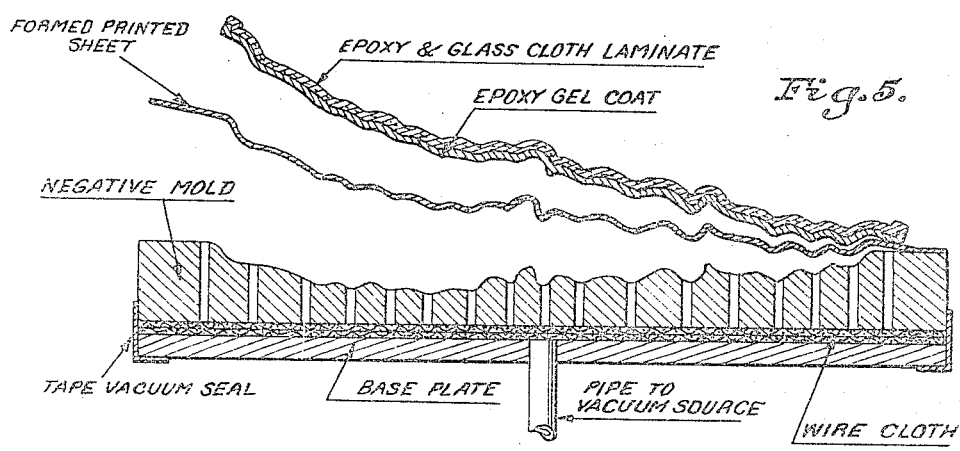
Figure 6:
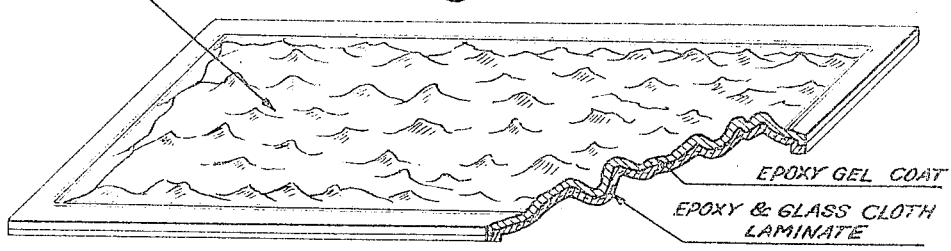

FIGS. 4, 5, and 6 depict the same steps as applied to a three-dimensional surface.

As stated above, the process depends upon the greater affinity of the epoxy for the inks or dyes comprising the image to be transferred than for that of the material upon which the image is printed originally. This printed sheet material must also be a material to which epoxy will not adhere. Materials satisfying these requirements are vinyl halide polymers including vinyl chloride in rigid, flexible or high impact form, polyethylene, cellulose acetates, cellulose acetate butyrates, and polyesters.

Also, as stated above, the image which is the subject of transfer must be printed in a material to which the epoxy has a strong affinity. These materials including vinyl based inks, pigmented bichromated casein inks, and oil soluble dyes, are either printed or reverse-printed upon the base material. If the image is reverse printed, the transferred image will be positive. A reverse image is one in which features and characters are reversed, from one side to another, as when the object is viewed in a mirror. Reverse printing is well known in the art of printing and in the art of map making. If the surface to which the transfer is made is to be three-dimensional, the base material upon which the image is printed, must be molded to the form of the three-dimensional model. The molding may be positive or negative depending upon whether a positive or negative image is desired. The choice will, of course, depend upon the nature of the printed matter and of the form to be transferred. Both positive and negative moldings of flat printed sheets are well known in the art of map making.

While the basic epoxy resin described above and more particularly described in Patent No. 2,848,435, issued to Leonard H. Griffin and James H. Long, assignors to Shell Development Company, New York, N.Y., on Aug. 19, 1958, will suffice for this process, it is desirable but not necessary, when applying the transfer process to the embodiments described below, to utilize two separate mixtures; one for the initial application, and another for a strengthening subsequent application to the printed sheet. These mixtures are called: (1) the epoxy gel coat, and (2) the epoxy and glass cloth laminating layer. The use, as well as the proportional amounts of the additives which, together with the basic epoxy resin, comprises the above-described mixtures, may be considerably varied depending upon the nature of the transfer to be made. These additives are not new in the laminating arts and are described and claimed herein only as they apply to the transfer process. Where it is desired that the finished product have fire retardent properties, antimony trioxide, and such chlorine releasing compounds as polyvinyl chloride, in ground or powdered form, may be utilized. The proportional amount of fire retardent materials is not critical and may be added in unlimited amounts or not at all. Where steep or vertical surfaces are utilized in the transfer process, a filler with thixotropic properties is desirable to prevent drainage particularly immediately after application of the initial gel coat layer. Such a filler as expanded silica has been successfully utilized for this purpose. Here again the proportional amount of the thixotropic agent is not critical. Recommended mixtures are described as preferred embodiments below. The epoxy resin is cured or hardened in a matter known in the laminating arts with the use of such amine-type hardeners as diethylene triamine, triethylene tetramine, and 4,4'-methylene dianiline. The proportionate parts of the aforesaid curing agents, their curing times, and post curing times are as follows:

| Curing Agent | Parts (by Wt.) Curing Agent to 100 Parts by Wt. Unfilled Epoxy Resin (Rm. Temp. Hardener) | Room Temp. Cure (25° C.), Hours | Post Cure to Strength for Hours | Obtain Max. Service Temp. in ° C. |
|---|---|---|---|---|
| Diethylene triamine | 10 | 20 | 2 | 100 |
| Triethylene tetramine | 10–12 | 20 | 2 | 150 |
| 4, 4'-methylene dianiline | 28.5 | 20 | 2 | 100 |
|  |  |  | 2 | 130 |

As is well known to those skilled in the art of laminating procedures, the amount of the curing agent is critical as the epoxy resin will not harden where less than approximately one-half of the above-recommended proportions, or more than approximately ten additional parts by weight for one hundred parts of the unfilled epoxy resin, is utilized at room temperature.

Referring now in detail to FIG. 1, the printed sheet is held firmly in place and in shape by a top plate which is a horizontal sheet of one-half inch thick aluminum through which a plurality of holes has been drilled with a number 60 wire drill. Under the top plate is a double thickness of wire mesh cloth of eight mesh galvanized wire. Supporting the wire mesh in the vacuum top plate is a base plate comprising in imperforate horizontal layer to which a vertically extending pipe is attached, the pipe extending through the vacuum base plate and terminating flush with the upper surface thereof. In order to prevent the entrance of air to the detriment of the vacuum, the side surfaces of the top plate and base plate are covered by an adhesive tape shown in FIG. 1 as a tape vacuum seal. Upon the top of the base plate is placed the printed sheet of vinyl chloride, polyethylene, cellulose acetate, or cellulose acetate butyrate. The image, in this preferred embodiment, is a reverse image, and should be on the side of the printed sheet away from the vacuum top plate. The edges of the printed sheet are secured to the top plate in an airtight manner by the use of adhesive tape or liquid cement. Vacuum is then applied to the printed sheet thereby holding it firmly in place and preventing distortion of the sheet and the image. The vacuum necessary to prevent distortion will, of course, vary according to the thickness and rigidity of the printed sheet, as well as the heat stability of the sheet and the exotherm of the resin. Where the heat is very flexible or unstable, it is recommended that up to twenty-six inches of vacuum be applied. Where the sheet is very rigid and stable no vacuum is required.

At this point, the printed sheet is ready for the application of the gel coat of epoxy resin. The recommended mixture for the gel coat in this embodiment is as follows:

100 parts by weight of the epoxy resin
40 parts by weight of the titanium dioxide
5 parts by weight of the polyvinyl chloride powder (200 mesh)
5 parts by weight of the antimony trioxide
3 parts by weight of the expanded silica The gel coat is prepared according to the following procedure. The resin is placed in a steam-heated, water-cooled, jacketed, blending machine equipped with S (Sigma) type blades. The steam is turned on and the resin is heated to between 200° and 210° F. The blades are then set in motion for about 10–15 minutes during which time the heat within the resin is uniformly distributed. The antimony trioxide and crushed polyvinyl chloride are then added and the mixture is again blended for from 1–2 hours. The titanium dioxide and expanded silica are then added and the blending process is repeated from 2–6 hours. This two stage blending process is of importance in that it assures a uniform distribution of the fire retardent material throughout the resin. Leaving the blender on, the steam heat is turned off and cold water is circulated through the jacket until the resin is cooled to room temperature. When the resin has cooled, the blades are turned off and the mixture should be allowed to set until all air trapped in the resin mixture has been permitted to escape. This may require up to eight hours. Immediately prior to the application of the gel coat to the printed sheet, the curing agent is added and thoroughly mixed. The gel coat may now be applied to the printed sheet by means of a paint brush. The initial coat is applied with a stippling motion in order to eliminate air bubbles entrapped in the material and to obtain a continuous coat of the resin. The initial coat should not exceed one-sixteenth of an inch in thickness. The gel coat is then cured at room temperature until it becomes hard and tack free in consistency. This curing period will vary from twenty minutes to one hour.

After the curing of the gel coat, there is applied an epoxy and glass cloth laminating layer. The resin for the laminating layer may be prepared in the manner described above for the gel coat using the following described portion:

100 parts by weight of epoxy resin
20 parts by weight of titanium dioxide
5 parts by weight of polyvinyl chloride powder (200 mesh)
5 parts by weight of antimony trioxide The gel coat is then painted with the laminating resin and a sheet of glass cloth is laid over the wet resin. More liquid resin is then stippled through the glass cloth. This step is repeated until a desired thickness of laminating resin and glass cloth is built up. Eight layers of glass cloth are recommended for a desirable degree of strength. The laminated resin layer requires from two to six hours to harden at room temperature. After hardening, the vacuum is discontinued, the seal is broken, and the epoxy layers together with the printed sheets are removed from the top plate. As shown in FIG. 2 the epoxy body is grasped in one hand and the formerly printed sheet is stripped therefrom by pulling apart with the other hand. FIG. 3 depicts the gel coat layer with the transferred image embedded therein in the form of a map of the United States, together with its laminated backing.

Referring now in detail to the second preferred embodiment, as illustrated in FIGS. 4, 5, and 6, the process being substantially similar to that described above with the first embodiment, is here described in detail only as it differs from the above described process. As the transfer here is to a three-dimension surface, the top plate must be replaced by a negative mold of the desired three-dimension surface made of plaster or a similar material. The mold contains a plurality of vertical air holes as in the vacuum top plate of the surface process except that the holes should be drilled in such a manner as to lead to the low points of the negative mold. The print sheet must also be in the form of a negative mold with the reverse image imprinted on the top side, that is, the side away from the mold. After the gel coat has been applied in the same manner as described above, and allow to cure, but prior to the application of the glass cloth reinforced layer if a solid flat base to the three-dimension model is desired, it is recommended that a batch of laminating resin, to which has been added enough chopped glass cloth, or flock, while mixing, to obtain a mixture of paste or putty-like consistency, be made. Normally a proportion of three times the volume of chopped glass to one volume of the resin is required to obtain this consistency. This paste-like resin mixture is then troweled carefully into the indentations of the three-dimension model, level and smoothed out, and allowed to cure at room temperature for a period of about two hours. This optional leveling layer is not depicted in FIGS. 4–6. The process is then completed, as described above, with the application of the laminating layers.

It is obvious that the above-described embodiments are by way of example only and that numerous changes may be made within the purview of this invention. All materials are capable or susceptible of change. Even with respect to the epoxy resin, equivalent substances may be found with properties capable of being adapted to this process.

I claim:

1. A transfer process comprising the steps of printing an informational pattern on a plastic sheet with a printing material, said sheet being selected from the group consisting of vinyl halide polymers, cellulose acetates, cellulose acetate butyrates, polyester resins and polyethylene and said print material being selected from the group consisting of vinyl base inks, pigmented bichromated casein inks and oil soluble dyes; coating the printed side of said plastic with a resin of a glycidyl ether of polyhydric phenol in the presence of a primary aliphatic amine, said coating material having greater affinity for the printing material than for the sheet; curing the coating; and physically stripping the coating from the aforesaid sheet.

2. A transfer process as in claim 1 wherein the coating material includes fire retardent materails comprising ground vinyl chloride and antimony trioxide, and a thixotropic agent of expanded silica.

3. A transfer process comprising the steps of coating a solid sheet of material selected from the group consisting of vinyl halide polymers, cellulose acetates, cellulose acetate butyrates, polyester resin and polyethylene; the sheet imprinted with a material selected from the group consisting of vinyl based inks, pigmented bichromated casein inks, and oil soluble dyes; the coating material being a resin of a glycidyl ether of polyhydric phenol in the presence of a primary aliphatic amine, fire retardent material comprising crushed vinyl chloride and antimony trioxide, and a thixotropic agent comprising expanded silica, said coating material having greater affinity for the printing material than for the sheet; curing the initial coating; further coating the printed sheet with a plurality of alternating layers of glass cloth and of the said resin; curing the laminated resin; and physically stripping the cured laminated resin from the said sheet.

4. A transfer process for flat surfaces comprising the steps of supporting and holding in shape a solid sheet by a vacuum plate, the solid sheet being of a material selected from the group consisting of vinyl halide polymers, cellulose acetates, cellulose acetate butyrates, polyester resins and polyethylene; the sheet being printed with a material selected from the group consisting of vinyl based inks, pigmented bichromated casein inks, and oil soluble dyes; coating the said sheet with a resin of glycidyl ether of the polyhydric phenol in the presence of a primary aliphatic amine, said coating material having greater affinity for the printing material than for the sheet; curing the initial coating; further coating the sheet with a plurality of alternating layers of glass cloth and the said resin; curing the laminated resin; and physically stripping the laminated resin from the said sheet.

5. A transfer process for three-dimension surfaces comprising the steps of supporting and holding a solid sheet in the form of a negative mold by a negative vacuum mold; the solid sheet being of a material selected from the group consisting of vinyl halide polymers, cellulose acetates, cellulose acetate butyrates, polyester resins and polyethylene; the sheet being printed with a material selected from the group consisting of vinyl based inks, pigmented bichromated casein inks, and oil soluble dyes; coating the aforesaid sheet with a resin of glycidyl ether of polyhydric phenol in the presence of a primary aliphatic amine, said coating material having greater affinity for the printing material than for the sheet; curing the initial coating; further coating the sheet with a plurality of alternating layers of glass cloth and the said resin; curing the laminated resin and physically stripping the laminated resin from the said sheet.

References Cited by the Examiner

UNITED STATES PATENTS

| 2,429,121 | 10/1947 | Crowley | 156—213 |
| 2,817,619 | 12/1957 | Bickel et al. | 156—239 |
| 2,830,721 | 4/1958 | Pinsky et al. | |
| 2,859,530 | 11/1958 | Renaud. | |
| 2,904,926 | 9/1959 | Cifredo | 45—131 |
| 2,920,009 | 1/1960 | Humphner | 154—95 |
| 2,951,001 | 8/1960 | Rubenstein | 156—277 |
| 2,954,311 | 9/1960 | Vander Weel | 154—95 |

FOREIGN PATENTS

| 798,398 | 7/1958 | Great Britain. |

OTHER REFERENCES

"Epoxy Resins," Skeist, 1958, pages 84, 182 and 184 cited.

"Handbook of Adhesives," Skeist, 1962, pages 490 and 493 cited. Copies of books available in Group 160.

EARL M. BERGERT, *Primary Examiner.*

CARL F. KRAFFT, *Examiner.*

R. I. SMITH, R. J. ROCHE, *Assistant Examiners.*